United States Patent [19]
Wei

[11] Patent Number: 5,559,561
[45] Date of Patent: Sep. 24, 1996

[54] CODED MODULATION WITH SHAPING GAIN AND TOMLINSON PRECODING

[75] Inventor: Lee-Fang Wei, Lincroft, N.J.

[73] Assignee: Lucent Technologies Inc., Murray Hill, N.J.

[21] Appl. No.: 276,079

[22] Filed: Jul. 15, 1994

[51] Int. Cl.$^6$ ................................................. H04N 7/04
[52] U.S. Cl. .......................... 348/470; 375/265; 375/296; 348/21
[58] Field of Search .................................... 375/262, 265, 375/254, 290, 296; 348/470, 22, 467, 461; H04N 7/04

[56] References Cited

U.S. PATENT DOCUMENTS

| | | | |
|---|---|---|---|
| 5,115,453 | 5/1992 | Calderbank et al. | 375/262 |
| 5,214,672 | 5/1993 | Eyuboglu | 375/265 |
| 5,249,200 | 9/1993 | Chen et al. | 375/296 |
| 5,263,051 | 11/1993 | Eyuboglu | 375/254 |
| 5,311,547 | 5/1994 | Wei | 375/290 |
| 5,388,124 | 2/1995 | Lavoia et al. | 375/265 |
| 5,394,440 | 2/1995 | Goldstein | 375/265 |

*Primary Examiner*—Victor R. Kostak
*Attorney, Agent, or Firm*—Ronald D. Slusky

[57] ABSTRACT

An HDTV transmission system includes a Tomlinson precoder in the transmitter in order to compensate for forced intersymbol interference introduced by an NTSC rejection filter used in the receiver. The system employs one of a family of four-dimensional coded modulation schemes based on a six-signal-point, one-dimensional base constellation. The various schemes exhibit different amounts of so-called shaping gain and support respective different payload data rates. The characteristics of the Tomlinson precoder are such as to preserve the substantial portion of the shaping gain. The system may switch its operation among the various coded modulation schemes to account for changes in channel conditions and/or to accommodate different source signal bit rates.

26 Claims, 11 Drawing Sheets

| 4D SUBSET | $Y3_n$ | $Y2_n$ | $Y1_n$ | $Y0_n$ | $Z0_n$ | $Z0_{n+1}$ | $Z0_{n+2}$ | $Z0_{n+3}$ | 1D-SUBSET SEQUENCE |
|---|---|---|---|---|---|---|---|---|---|
| 0 | 0 | 0 | 0 | 0 | 0 | 0 | 0 | 0 | (A, A, A, A) |
|   | 1 | 0 | 0 | 0 | 1 | 1 | 1 | 1 | (B, B, B, B) |
| 1 | 0 | 0 | 0 | 1 | 0 | 0 | 0 | 1 | (A, A, A, B) |
|   | 1 | 0 | 0 | 1 | 1 | 1 | 1 | 0 | (B, B, B, A) |
| 2 | 0 | 0 | 1 | 0 | 0 | 0 | 1 | 1 | (A, A, B, B) |
|   | 1 | 0 | 1 | 0 | 1 | 1 | 0 | 0 | (B, B, A, A) |
| 3 | 0 | 0 | 1 | 1 | 0 | 0 | 1 | 0 | (A, A, B, A) |
|   | 1 | 0 | 1 | 1 | 1 | 1 | 0 | 1 | (B, B, A, B) |
| 4 | 0 | 1 | 0 | 0 | 0 | 1 | 0 | 1 | (A, B, A, B) |
|   | 1 | 1 | 0 | 0 | 1 | 0 | 1 | 0 | (B, A, B, A) |
| 5 | 0 | 1 | 0 | 1 | 0 | 1 | 1 | 1 | (A, B, B, B) |
|   | 1 | 1 | 0 | 1 | 1 | 0 | 0 | 0 | (B, A, A, A) |
| 6 | 0 | 1 | 1 | 0 | 0 | 1 | 1 | 0 | (A, B, B, A) |
|   | 1 | 1 | 1 | 0 | 1 | 0 | 0 | 1 | (B, A, A, B) |
| 7 | 0 | 1 | 1 | 1 | 0 | 1 | 0 | 0 | (A, B, A, A) |
|   | 1 | 1 | 1 | 1 | 1 | 0 | 1 | 1 | (B, A, B, B) |

FIG. 6

| $Y8_n$ $Y7_n$ $Y6_n$ $Y5_n$ $Y4_n$ | $Z2_n$ $Z1_n$ | $Z2_{n+1}$ $Z1_{n+1}$ | $Z2_{n+2}$ $Z1_{n+2}$ | $Z2_{n+3}$ $Z1_{n+3}$ |
|---|---|---|---|---|
| 0  | 0 | 0 | 0 | 0 |
| 1  | 0 | 0 | 0 | 1 |
| 2  | 0 | 0 | 1 | 0 |
| 3  | 0 | 0 | 1 | 1 |
| 4  | 0 | 1 | 0 | 0 |
| 5  | 0 | 1 | 0 | 1 |
| 6  | 0 | 1 | 1 | 0 |
| 7  | 0 | 1 | 1 | 1 |
| 8  | 1 | 0 | 0 | 0 |
| 9  | 1 | 0 | 0 | 1 |
| 10 | 1 | 0 | 1 | 0 |
| 11 | 1 | 0 | 1 | 1 |
| 12 | 1 | 1 | 0 | 0 |
| 13 | 1 | 1 | 0 | 1 |
| 14 | 1 | 1 | 1 | 0 |
| 15 | 1 | 1 | 1 | 1 |
| 16 | 2 | 0 | 0 | 0 |
| 17 | 2 | 0 | 0 | 1 |
| 18 | 2 | 0 | 1 | 0 |
| 19 | 2 | 1 | 0 | 0 |
| 20 | 0 | 2 | 0 | 0 |
| 21 | 0 | 2 | 0 | 1 |
| 22 | 0 | 2 | 1 | 0 |
| 23 | 1 | 2 | 0 | 0 |
| 24 | 0 | 0 | 2 | 0 |
| 25 | 0 | 1 | 2 | 0 |
| 26 | 1 | 0 | 2 | 0 |
| 27 | 0 | 0 | 2 | 1 |
| 28 | 0 | 0 | 0 | 2 |
| 29 | 0 | 1 | 0 | 2 |
| 30 | 1 | 0 | 0 | 2 |
| 31 | 0 | 0 | 1 | 2 |

FIG. 7

BIT PATTERN: $Z2_m$ $Z1_m$ $Z0_m$ (m = n, n+1, n+2, n+3)

| INPUT BIT PATTERN* | | | OUTPUT BIT PATTERN* | | | |
|---|---|---|---|---|---|---|
| 0 | 0 | 0 | 0 | 0 | 0 | 0 |
| 0 | 0 | 1 | 0 | 0 | 0 | 1 |
| 0 | 1 | 0 | 0 | 1 | 0 | 0 |
| 0 | 1 | 1 | 0 | 1 | 0 | 1 |
| 1 | 0 | 0 | 1 | 0 | 0 | 0 |
| 1 | 0 | 1 | 1 | 0 | 0 | 1 |
| 1 | 1 | 0 | 0 | 0 | 1 | 0 |
| 1 | 1 | 1 | 0 | 1 | 1 | 0 |

*READING FROM TOP TO BOTTOM IN FIGURE 8

FIG. 10

| Y9n Y8n Y7n Y6n Y5n Y4n | Z2n Z1n | Z2n+1 Z1n+1 | Z2n+2 Z1n+2 | Z2n+3 Z1n+3 |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 10 | 1 | 0 | 1 | 0 |
| 11 | 1 | 0 | 1 | 1 |
| 12 | 1 | 1 | 0 | 0 |
| 13 | 1 | 1 | 0 | 1 |
| 14 | 1 | 1 | 1 | 0 |
| 15 | 1 | 1 | 1 | 1 |
| 16 | 2 | 0 | 0 | 0 |
| 17 | 2 | 0 | 0 | 1 |
| 18 | 2 | 0 | 1 | 0 |
| 19 | 2 | 1 | 0 | 0 |
| 20 | 0 | 2 | 0 | 0 |
| 21 | 0 | 2 | 0 | 1 |
| 22 | 0 | 2 | 1 | 0 |
| 23 | 1 | 2 | 0 | 0 |
| 24 | 0 | 0 | 2 | 0 |
| 25 | 0 | 1 | 2 | 0 |
| 26 | 1 | 0 | 2 | 0 |
| 27 | 0 | 0 | 2 | 1 |
| 28 | 0 | 0 | 0 | 2 |
| 29 | 0 | 1 | 0 | 2 |
| 30 | 1 | 0 | 0 | 2 |
| 31 | 0 | 0 | 1 | 2 |
| 32 | 2 | 0 | 1 | 1 |
| 33 | 2 | 1 | 0 | 1 |
| 34 | 2 | 1 | 1 | 0 |
| 35 | 2 | 1 | 1 | 1 |
| 36 | 0 | 2 | 1 | 1 |
| 37 | 1 | 2 | 0 | 1 |
| 38 | 1 | 2 | 1 | 0 |
| 39 | 1 | 2 | 1 | 1 |
| 40 | 1 | 1 | 2 | 0 |
| 41 | 0 | 1 | 2 | 1 |
| 42 | 1 | 0 | 2 | 1 |
| 43 | 1 | 1 | 2 | 1 |
| 44 | 1 | 1 | 0 | 2 |
| 45 | 0 | 1 | 1 | 2 |
| 46 | 1 | 0 | 1 | 2 |
| 47 | 1 | 1 | 1 | 2 |

FIG. 11

| SCHEME | PAYLOAD (Mbps) | INPUT BIT RATE OF TRELLIS CODE (PER 4D SYMBOL INTERVAL) | USAGE PROBABILITY OF SIGNAL POINT | | | | | | SHAPING GAIN (dB) | |
|---|---|---|---|---|---|---|---|---|---|---|
| | | | -5 | -3 | -1 | 1 | 3 | 5 | AT OUTPUT OF CONSTELLATION MAPPER | AT OUTPUT OF TOMLINSON PRECODER |
| I | 19.5 | 8 | 0.06 | 0.17 | 0.27 | 0.27 | 0.17 | 0.06 | 2.38 | 1.94 |
| II | 20.7 | 8.5 | 0.08 | 0.20 | 0.22 | 0.22 | 0.20 | 0.08 | 1.67 | 1.34 |
| III | 21.9 | 9 | 0.12 | 0.19 | 0.19 | 0.19 | 0.19 | 0.12 | 0.67 | 0.46 |

CODED MODULATION WITH SHAPING GAIN AND TOMLINSON PRECODING

BACKGROUND OF THE INVENTION

The present invention relates to the transmission of digital data and, more particularly, to high-definition television.

A problem arises in the context of the transmission of high-definition television (HDTV) signals in channels that are allocated for standard, so-called NTSC TV transmission. The problem specifically arises in areas where channels that are unused for NTSC transmission —and are thus candidates for HDTV transmission —are used for NTSC transmissions in relatively proximate areas. As an example, TV channel 3 is currently unused in the New York City metropolitan area, but is used in both Philadelphia and Hartford. The consequence of such proximity is that if channel 3 is to be used for HDTV in New York City, the HDTV signal may be corrupted by the channel 3 NTSC signal from Philadelphia or Hartford for New York City HDTV viewers. Conversely, the NTSC signal may be corrupted by the HDTV signal. Such corruption is referred to as "co-channel interference."

The co-channel interference from the HDTV signal to the NTSC signal can be satisfactorily dealt with by specifying in the HDTV standards (still under consideration) a sufficiently low transmit power level. Moreover, in order to deal with co-channel interference from the NTSC signal to the HDTV signal, it has been proposed to rely on the fact that an NTSC signal is dominated by energy concentrations at particular locations in the frequency spectrum. Thus, it has been proposed to provide an HDTV receiver with a filter, hereinafter referred to as an NTSC rejection filter, having nulls at those frequency locations, thereby removing a significant portion of the interfering NTSC signal, while only minimally degrading the HDTV signal.

The proposed HDTV standards envision a digital transmission format in which the bit stream representing the baseband HDTV signal is mapped, via a so-called channel code, into channel symbols each comprised of one or more so-called signal points. A potential problem in such arrangements is that the NTSC rejection filter creates so-called forced intersymbol interference (ISI) in the receiver, which corrupts the received signal points.

SUMMARY OF THE INVENTION

It is known in the prior art to deal with the forced ISI by using a so-called Tomlinson precoder in the transmitter which uses a feedback signal to operate on the sequence of signal points specified by the channel code. However, it is commonly held belief that the Tomlinson precoder will invariably remove any so-called "shaping gain" in the signal points generated by the channel code. Such shaping gain is achieved at the expense of bandwidth efficiency (measured in bits per channel symbol). The prior art is thus such as to teach away from the notion of using a channel code having shaping gain in conjunction with a Tomlinson precoder. After all, there is no point in sacrificing bandwidth efficiency for shaping gain, only to have the shaping gain removed by the Tomlinson precoder.

In accordance with the present invention, however, I have recognized that the aforementioned commonly held belief is erroneous. Specifically, I have discovered that if the aforementioned Tomlinson precoder feedback signal is relatively weak compared to the Tomlinson precoder input signal, the shaping gain (if any) of the channel code will be substantially preserved in the Tomlinson precoder output. Thus an overall transmission scheme embodying the principles of the present invention comprises a channel encoder which provides a more-than-minimal amount of shaping gain in conjunction with a Tomlinson precoder.

The invention, more particularly, contemplates the use of a channel code which provides such a high degree of shaping gain of its signal points that the shaping gain of the signal points that are output by the Tomlinson precoder is at least 1.0 dB, when compared to signal points generated by a channel encoder without shaping gain and without use of the Tomlinson precoder. (Even under the constraint mentioned above vis-a-vis the Tomlinson precoder feedback signal, there will still be a small loss of the shaping gain due to the action of the Tomlinson precoder.) A shaping gain of 1.0 dB is significant, and is achieved only via such a large tradeoff in bandwidth efficiency that, absent the teachings of the present invention, the prior art—because of the aforementioned commonly held belief—is not led to use, in a system which includes a Tomlinson precoder, a channel code having such a large amount of shaping gain.

DETAILED DESCRIPTION

Figure 1:
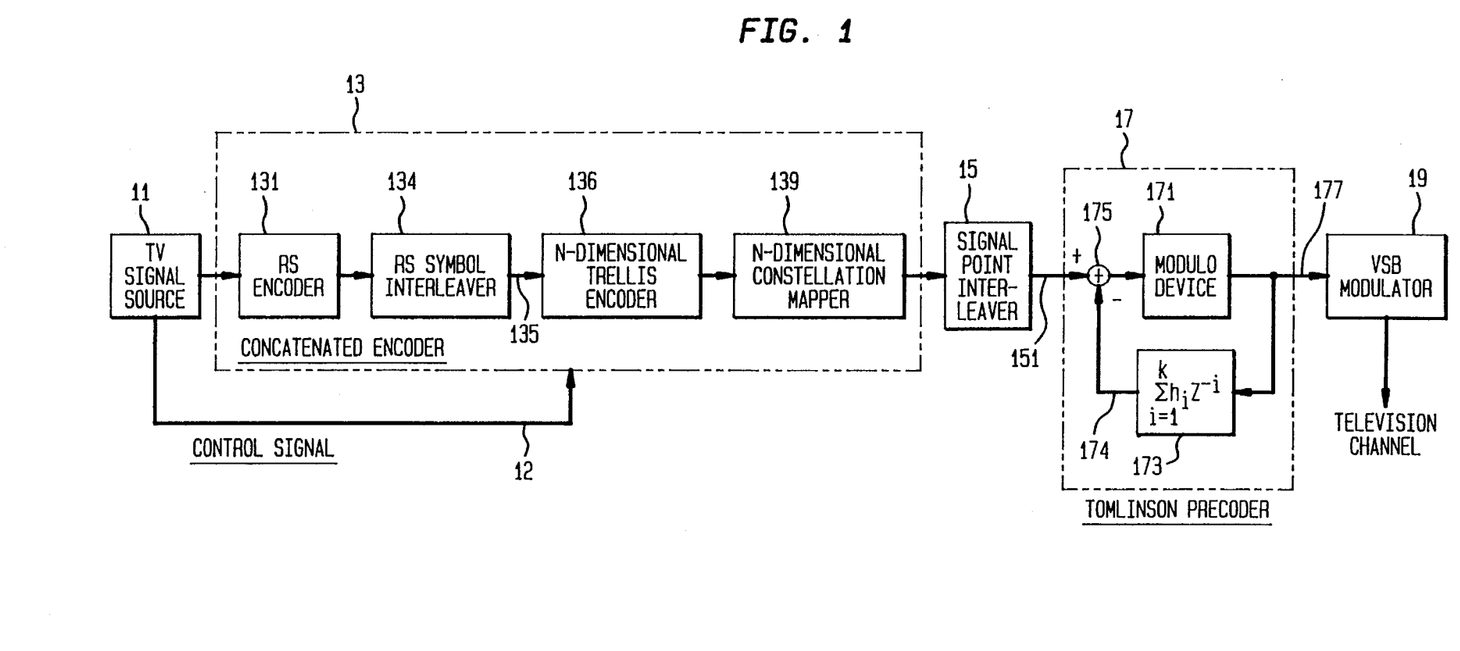
FIG. 1 is a block diagram of an HDTV transmitter embodying the principles of the present invention.
Figure 3:
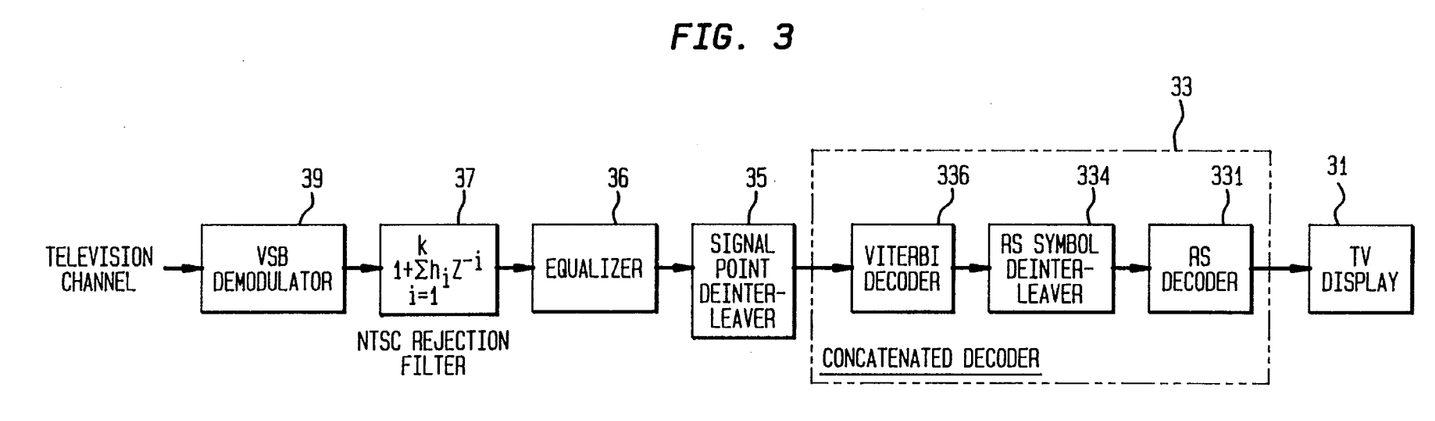
FIG. 3 is a block diagram of an HDTV receiver adapted to receive HDTV signals generated by the transmitter of FIG. 1.

The following detailed description presents, in the order named, descriptions of an HDTV system comprised of the transmitter and receiver of FIGS. 1 and 3 ("System Overview"); the trellis codes that can be used in the HDTV system ("Trellis Codes"); the characteristics of those codes ("Characteristics of the Codes"); how the shaping gain of those codes is preserved, pursuant to the principles of the present invention ("Preservation of Shaping Gain"); and how the shaping gain characteristics of the various codes can be used to advantage ("Shaping Gain Diversity").

SYSTEM OVERVIEW

FIG. 1 shows a television transmitter embodying the principles of the invention. A television signal—illustratively an HDTV signal—is provided by signal source 11. Signal source 11 includes circuitry for compressing the TV signal and putting it into an HDTV format, as well as certain standard modem-type circuitry such as a circuitry which randomizes the bit stream—the so-called "scrambler."

The HDTV signal thus generated is applied to concatenated encoder 13, which includes the serial combination of Reed-Solomon encoder 131; an RS symbol interleaver 134, which reorders the sequence of Reed-Solomon symbols generated by encoder 131 in order to provide protection against so-called "bursty" errors introduced either in the television channel or the receiver; N-dimensional trellis encoder 136; and N-dimensional constellation mapper 139. Illustratively, the Reed-Solomon code implemented by encoder 131 is a so-called RS(208,188) code over a finite field GF(256), and also illustratively, N=4. The combination of trellis encoder 136 and constellation mapper 139 implement a type of channel code referred to as "coded modulation."

In particular, the output of trellis encoder 136 is a sequence of data words identifying a sequence of four-dimensional symbols. Each of the four-dimensional symbols is to be transmitted in the form of a sequence of four one-dimensional signal points. To this end, the data words identifying the four-dimensional symbols are applied within concatenated encoder 13 to four-dimensional constellation mapper 139, whose output for each identified symbol is a sequence of four one-dimensional signal points. Since the signal points are one-dimensional, each signal point is simply represented as a signed number. There are M possible signal point values.

Figure 2:
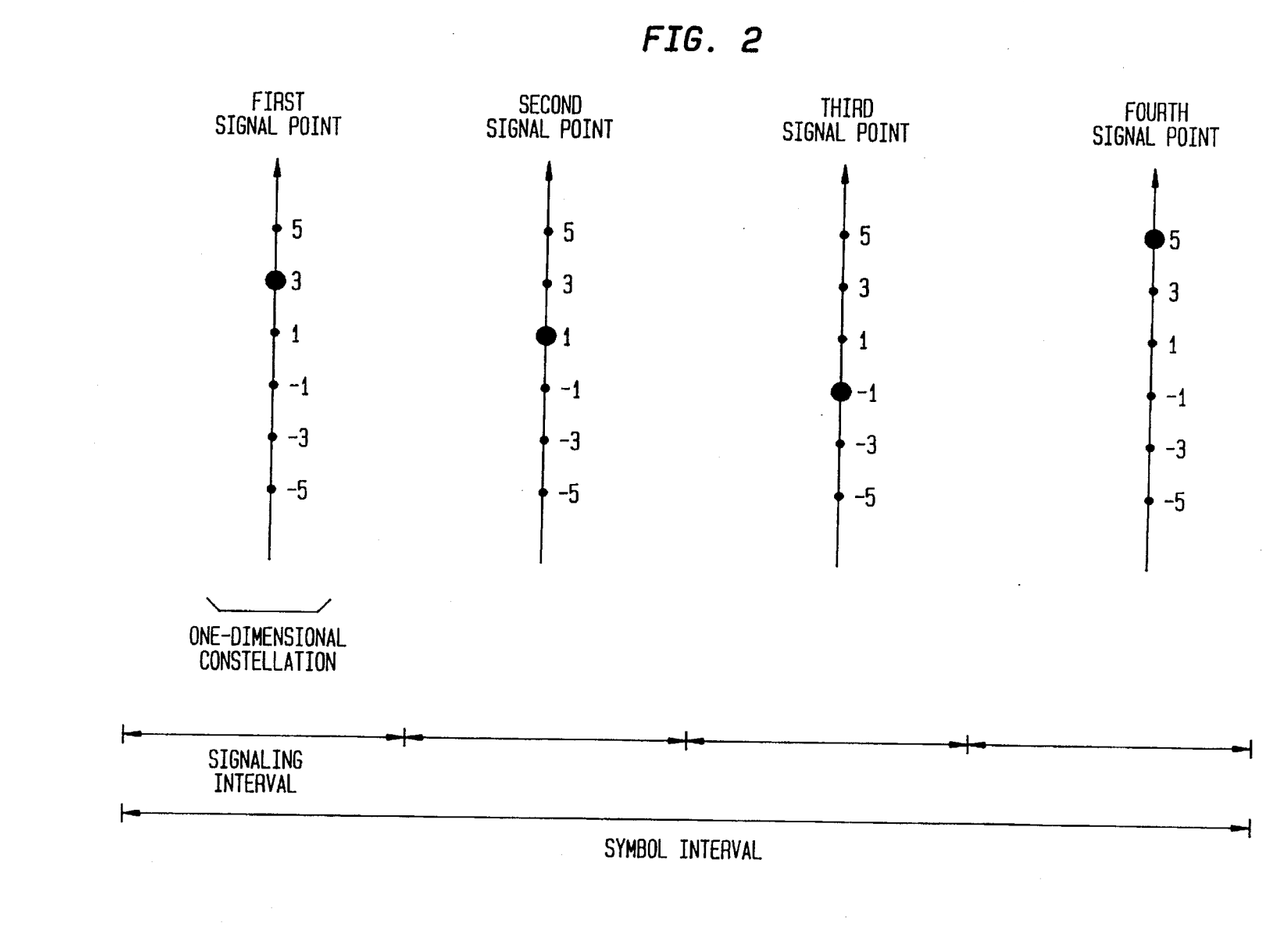
FIG. 2 is a chart helpful in describing the trellis code that can be used as part of the overall channel code in the HDTV system comprised of the transmitter of FIG. 1 and the receiver of FIG. 3.

FIG. 2 shows graphically the relationship between the aforementioned one-dimensional signal points and the four-dimensional symbols. Each four-dimensional symbol generated by constellation mapper 139 is comprised of a sequence of four signal points. Each signal point is a point in a predetermined one-dimensional base constellation. The one-dimensional constellation illustratively has six signal points located at coordinates −5, −3, −1, 1, 3 and 5. The four-dimensional symbol is delivered during a so-called symbol interval, or equivalently, four so-called signaling intervals, one signal point in each signaling interval. The assemblage of all four-dimensional symbols that can be output by constellation mapper 139 is referred to as the four-dimensional constellation. A particular one four-dimensional symbol—(3,1,−1,5)—is represented in FIG. 2 via an enlarged signal point of each of the one-dimensional constellations.

Returning to FIG. 1, the signal point values generated by constellation mapper 139 are applied to signal point interleaver 15 of the type described in my U.S. Pat. No. 5,056,112 issued Oct. 8, 1991, which reorders the sequence of signal point values. The combination of this interleaver with a corresponding de-interleaver in the receiver advantageously causes the noise in the received signal to be whitened prior to being Viterbi decoded in the receiver as noted below.

The interleaved signal points are applied to Tomlinson precoder 17, which compensates in advance for so-called forced intersymbol interference (ISI) that is introduced in the receiver by the receiver's NTSC rejection filter.

The output of the Tomlinson precoder is a sequence of values which no longer take on the finite number of values −5, −3, −1, 1, 3 and 5, but, rather, a continuous set of values within a bounded range between −6 and +6. These values are applied to vestigial—sideband, or VSB, modulator 19.

The VSB signal generated by modulator 19 is applied to a television channel, such as an over-the-air channel or a cable, and is received by the receiver of FIG. 3.

Within the receiver, the received VSB signal is applied to VSB demodulator 39. Its output is processed by NTSC rejection filter 37, which has notches corresponding to those regions of the NTSC television signal spectrum where the signal energy is concentrated. This filter thus advantageously removes a major source of interference in the HDTV signal when the HDTV transmitter of FIG. 1 is in relatively close proximity to an NTSC transmitter broadcasting on the same television channel. The resulting signal is equalized by equalizer 36 to compensate for intersymbol interference introduced by the channel. The output of equalizer 36 is the equalizer's best approximation of the values of the sequence of interleaved signal points that was generated by signal point interleaver 15. The equalizer output is first de-interleaved in signal-point de-interleaver 35 and then applied to concatenated decoder 33 which includes Viterbi decoder 336; RS symbol de-interleaver 334, which re-orders the Reed Solomon symbols; and Reed-Solomon decoder 331, which provides a recovered version of the HDTV signal. The latter is decompressed and deformatted within television set 31 and displayed thereon. (Some of the values that are output by equalizer 36 may be offset by a constant value of "12" or "−12" as a result of the action of Tomlinson precoder 17. Such an offset, however, is compensated for by the Viterbi decoder.)

(Although not explicitly shown or described herein, it should be mentioned, as is well known by those skilled in the art, that so-called synchronization signal points are periodically inserted by the transmitter into the signal point stream that it receives from signal-point interleaver 15. The receiver recognizes these synchronization signal points and, in response, generates a synchronization control signal which is used, in conventional fashion, by various components of the receiver (e.g., de-interleaver 334) in order to synchronize their operations with those of corresponding components in the transmitter (e.g, interleaver 134).

The internal structures of the various components of the transmitter and receiver of FIGS. 1 and 3 hereof are generally similar to those known to persons skilled in the art and need not be described in further detail herein.

TRELLIS CODES

A first coded modulation scheme that can be implemented by the combination of trellis encoder 136 and constellation mapper 139 is shown in FIGS. 4–7. This scheme encodes 8 bits per four-dimensional symbol of a predetermined four-dimensional constellation.

Figure 4:
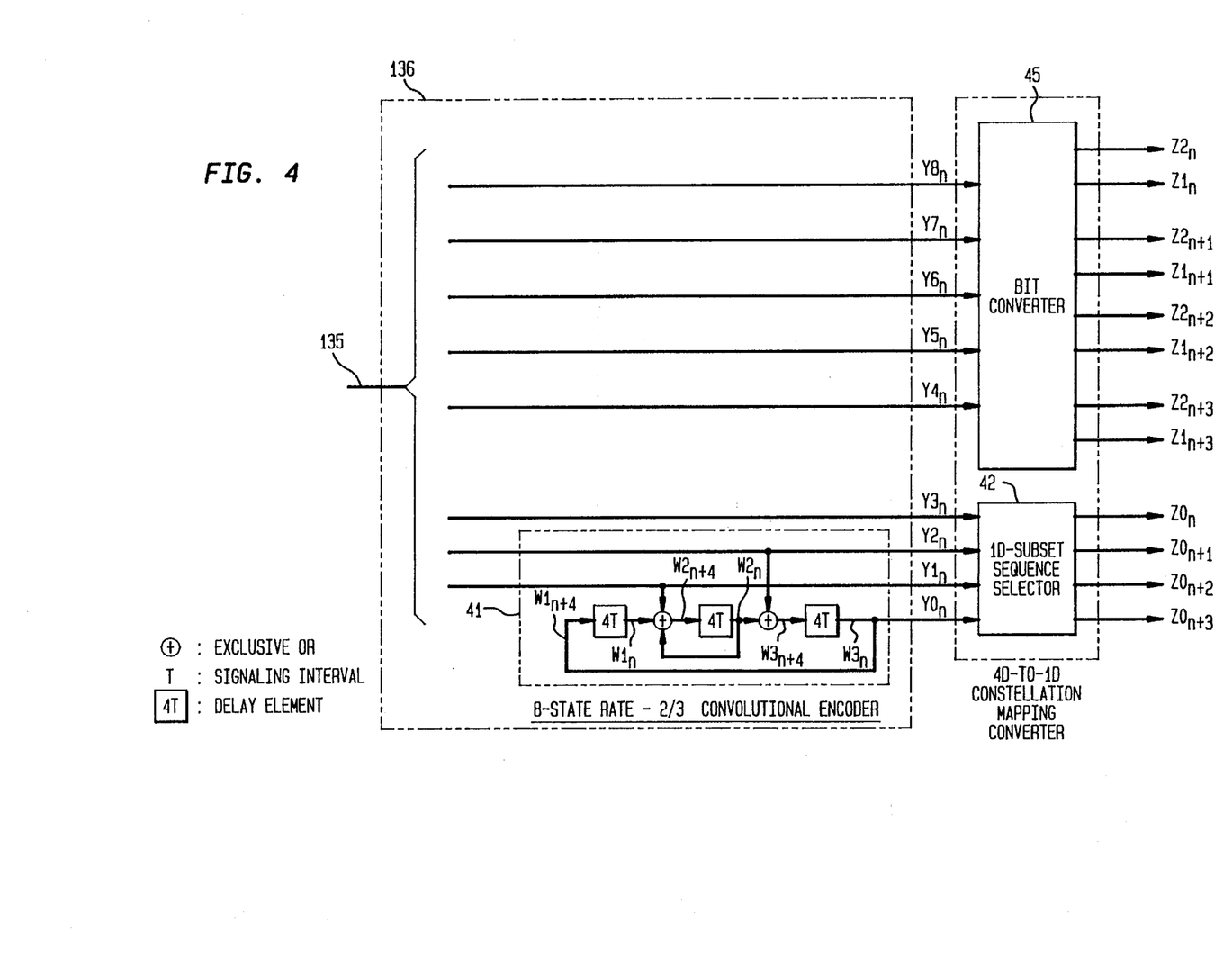
FIGS. 4–7 describe a first illustrative trellis code.

FIG. 4 shows the structure of trellis encoder 136. As shown in the FIG., trellis encoder 136 receives the stream of serial bits supplied by RS symbol interleaver 134 and collects them into groups of eight parallel bits (e.g. by a serial-to-parallel converter not shown), denoted $Y1_n$ through $Y8_n$, where "n" denotes the current signaling interval. Bits $Y1_n$ and $Y2_n$ are applied to an eight-state, rate ⅔ convolutional encoder 41 which provides three output bits. One of them, denoted $Y0_n$, is generated by the delay elements and exclusive—OR circuits which comprise the convolutional encoder. Encoder 41 is a so-called "systematic" convolutional encoder, so that its other two output bits are simply its two input bits $Y1_n$ and $Y2_n$.

The operations of convolutional encoder 41 can be explicitly described as follows. In each Symbol interval, designated by the index "n" for its first signaling interval, the encoder makes a transition from its current state $W1_n\ W2_n\ W3_n$ to a next state $W1_{n+4}, W2_{n+4}\ W3_{n+4}$ and outputs three bits $Y2_n, Y1_n,$ and $Y0_n$, where $W1_n, W2_n,$ and $W3_n$ are the bits stored in the delay elements at the beginning of the symbol interval, and $W1_{n+4}, W2_{n+4},$ and $W3_{n+4}$ are the bits stored in the delay elements at the end of the symbol interval, and $Y0_n = W3_n$ $W1_{n+} = W3_n$ $$W2_{n+4} = W1_n \oplus W2_n \oplus Y1_n$$

$$W3_{n+4} = W2_n \oplus Y2_n$$

Each of the eight different possible bit patterns represented by the three output bits of convolutional encoder 41 identifies a respect subset of the symbols of the four-dimensional constellation. The remaining six, so-called "uncoded," bits $Y3_n$ through $Y8_n$ further select a particular symbol from the identified four-dimensional subset.

Figure 5:
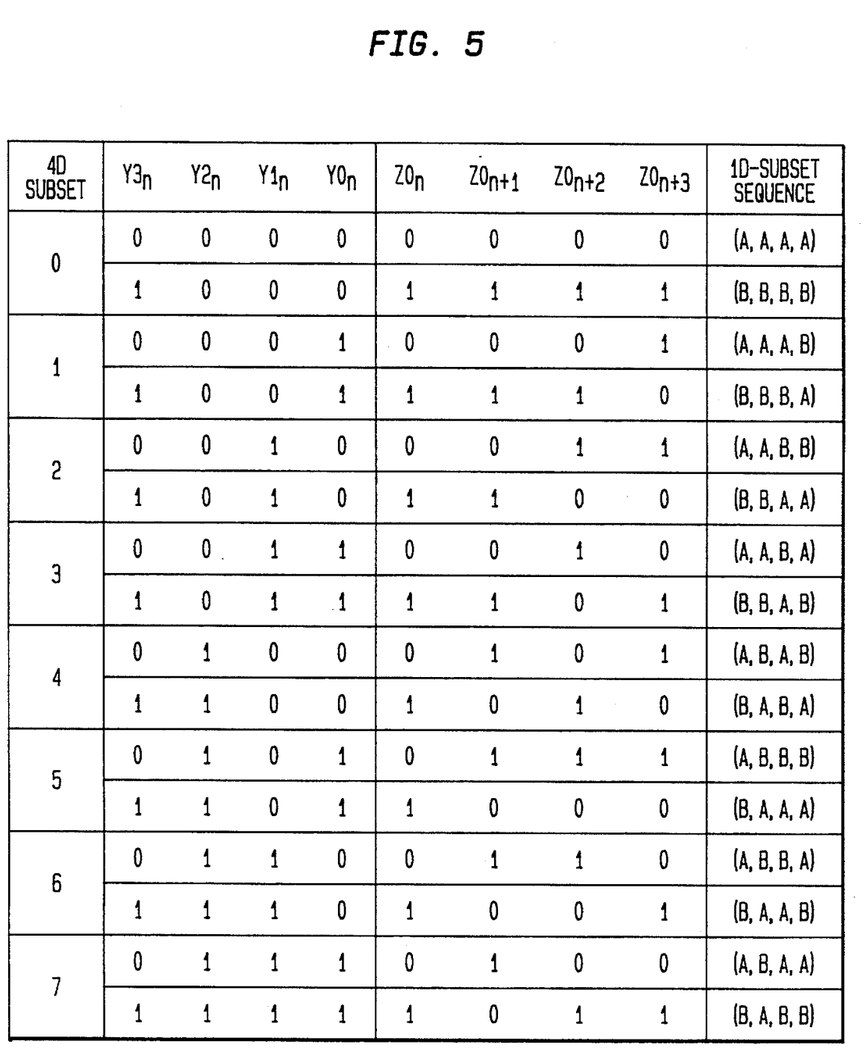
Figure 6:
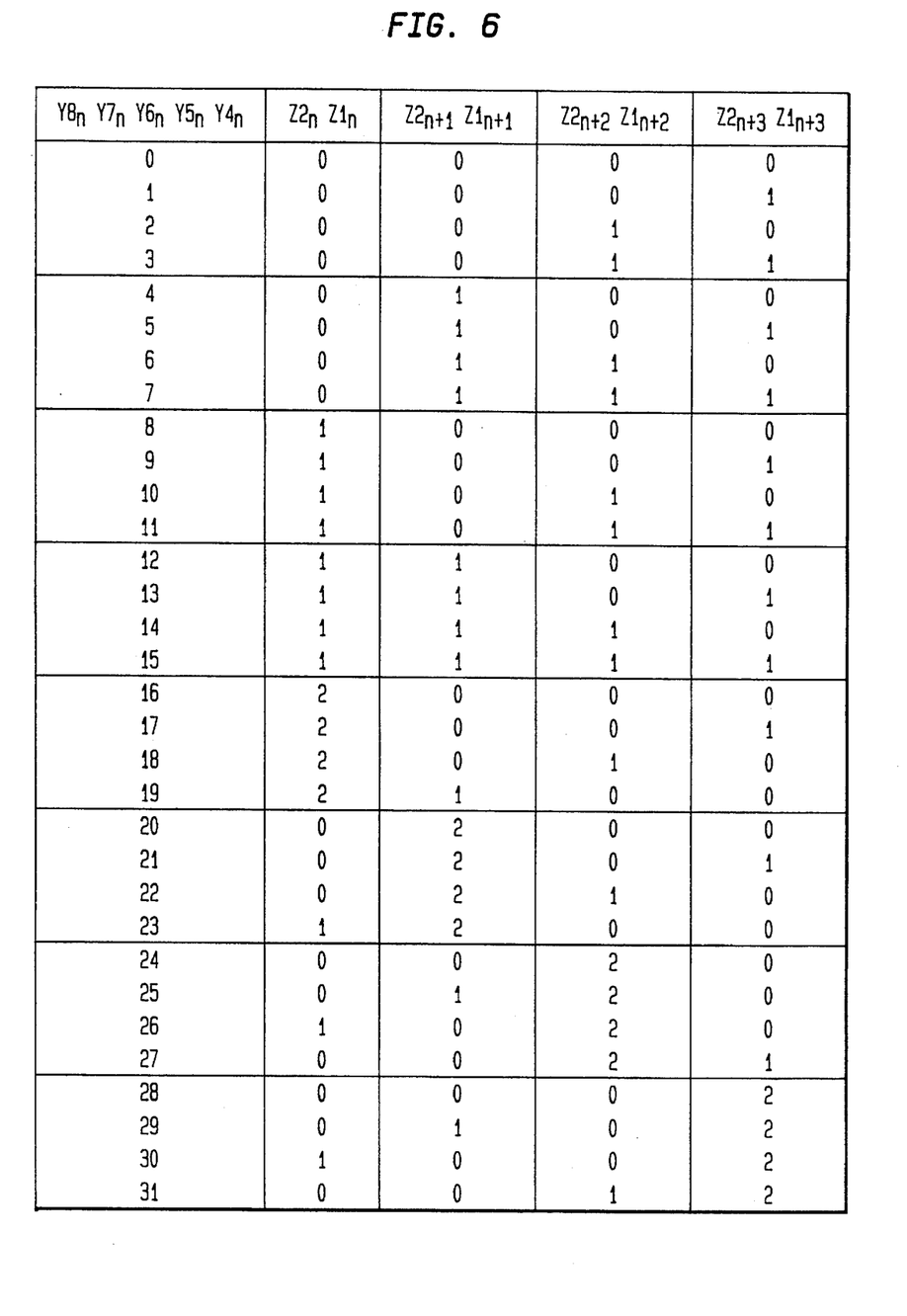
Figure 7:
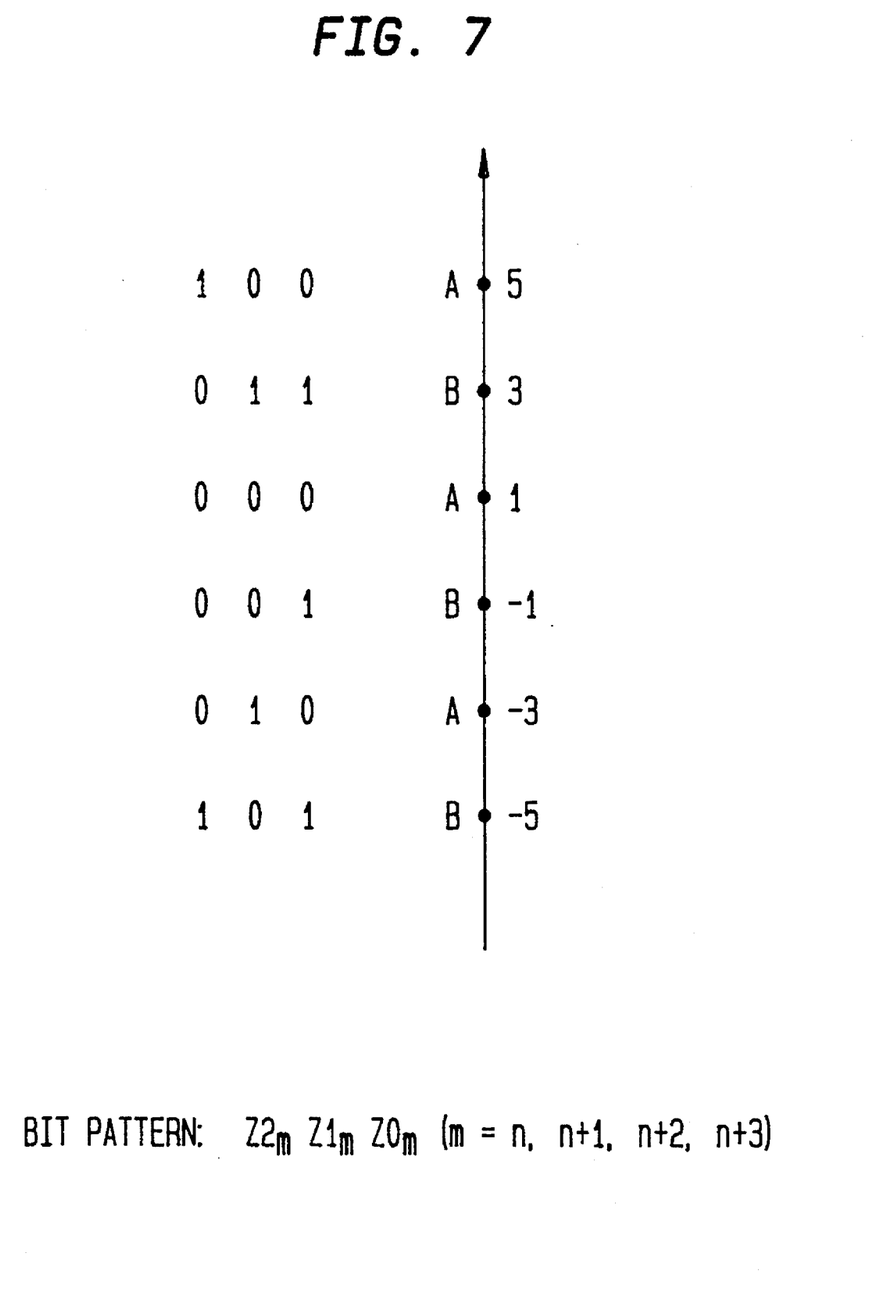

In particular, the symbols of the four-dimensional constellation are partitioned into the aforementioned eight subsets based on a partitioning of its constituent one-dimensional base constellations. FIG. 7 shows how the one-dimensional six-point constellation is partitioned into two subsets, A and B, each subset having three one-dimensional signal points. The four-dimensional constellation is then partitioned into eight four-dimensional subsets, 0, 1, . . . and 7. As shown in FIG. 5, each four-dimensional subset consists of two sequences of four one-dimensional subsets. For example, four-dimensional subset 2 consists of the two one-dimensional subset sequences (A,A,B,B) and (B,B,A,A), meaning that if a four-dimensional symbol is a member of subset 2, then either one of two criteria are met. Referring back to FIG. 2, one possibility is that its first constituent one-dimensional signal point is taken from subset A of the first constituent one-dimensional constellation; its second constituent one-dimensional signal point is taken from subset A of the second constituent one-dimensional constellation; its third constituent one-dimensional signal point is taken from subset B of the third constituent one-dimensional constellation; and its fourth constituent one-dimensional signal point is taken from subset B of the fourth constituent one-dimensional constellation. The other possibility is that its first constituent one-dimensional signal point is taken from subset B of the first constituent one-dimensional constellation; its second constituent one-dimensional signal point is taken from subset B of the second constituent one-dimensional constellation; its third constituent one-dimensional signal point is taken from subset A of the third constituent one-dimensional constellation; and its fourth constituent one-dimensional signal point is taken from subset A of the fourth constituent one-dimensional constellation.

The selection of a particular symbol from the identified four-dimensional subset proceeds as follows: The three bits, $Y2_n$, $Y1_n$, and $Y0_n$, from convolutional encoder 41, along with an uncoded input bit $Y3_n$, are first converted by a one-dimensional subset sequence selector 42 into another four bits, $Z0_n$, $Z0_{n+1}$, $Z0_{n+2}$, and $Z0_{n+3}$. FIG. 5 shows the detail of this conversion. The effect of this operation is to select one of the two possible one-dimensional subset sequences of the 4-dimensional subset identified by bits $Y0_n$ through $Y2_n$—for example (A,A,B,B) or (B,B,A,A) of subset 2. Bits $Y4_n$ through $Y8_n$ are then used to select a symbol from the identified one-dimensional subset sequence.

There are actually 81 possible symbols in each one-dimensional subset sequence, as can be seen from the fact that each one-dimensional subset has three signal points, and $3^4=81$. However, since the five bits $Y4_n$ through $Y8_n$ can represent only 32 different bit patterns, not all of the 81 symbols will actually be used. Rather, it is advantageous for the lookup table of FIG. 6 to map the 32 input bit patterns into the 32 smallest—energy symbols (the energy of a symbol being simply given by the sum of the squares of the coordinates of its constituent one-dimensional signal points.) To this end, bits $Y4_n$ through $Y8_n$ are applied to bit converter 45 which implements the lookup table shown in FIG. 6. The first pair of output bits of converter 45—denoted $Z2_n$ and $Z1_n$—select a signal point from the first subset of the one-dimensional subset sequence, which is identified by bit $Z0_n$. The second pair of output bits of converter 45—denoted $Z2_{n+1}$ and $Z1_{n+1}$—select a signal point from the second subset of the one-dimensional subset sequence, which is identified by bit $Z0_{n+1}$, and so forth. FIG. 7 shows the mapping by which the bit values of $Z2_m$, $Z1_m$ and $Z0_m$ for m=n, n+1, n+2 and n+3 identify a particular one-dimensional signal point.

Figure 8:
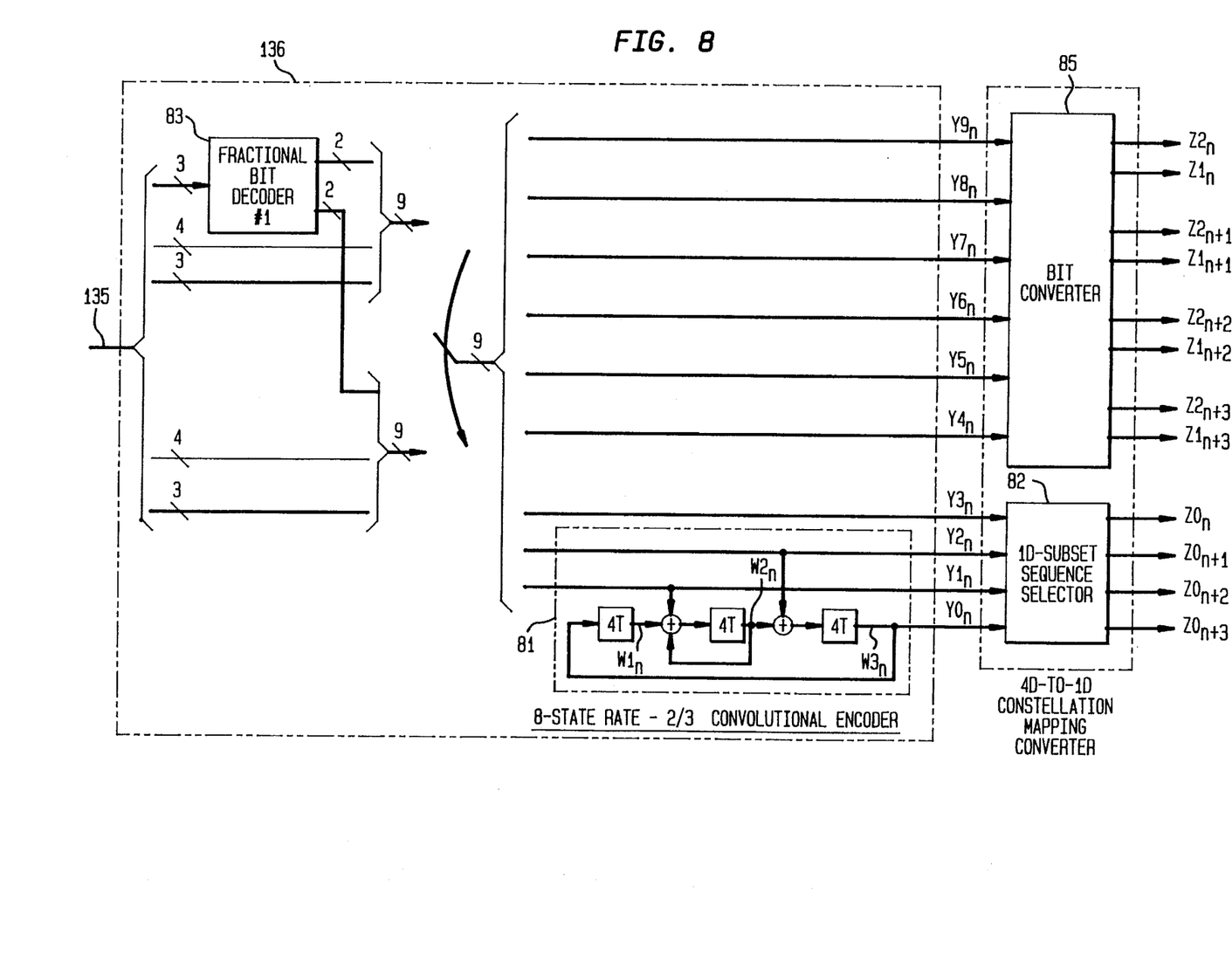
FIGS. 8–10 describe a second illustrative trellis code.
Figure 9:
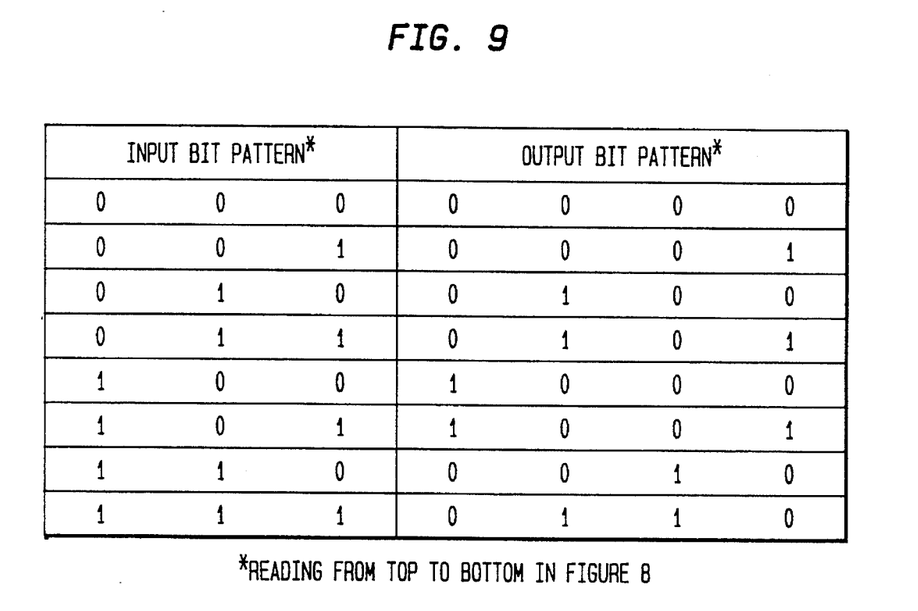
Figure 10:
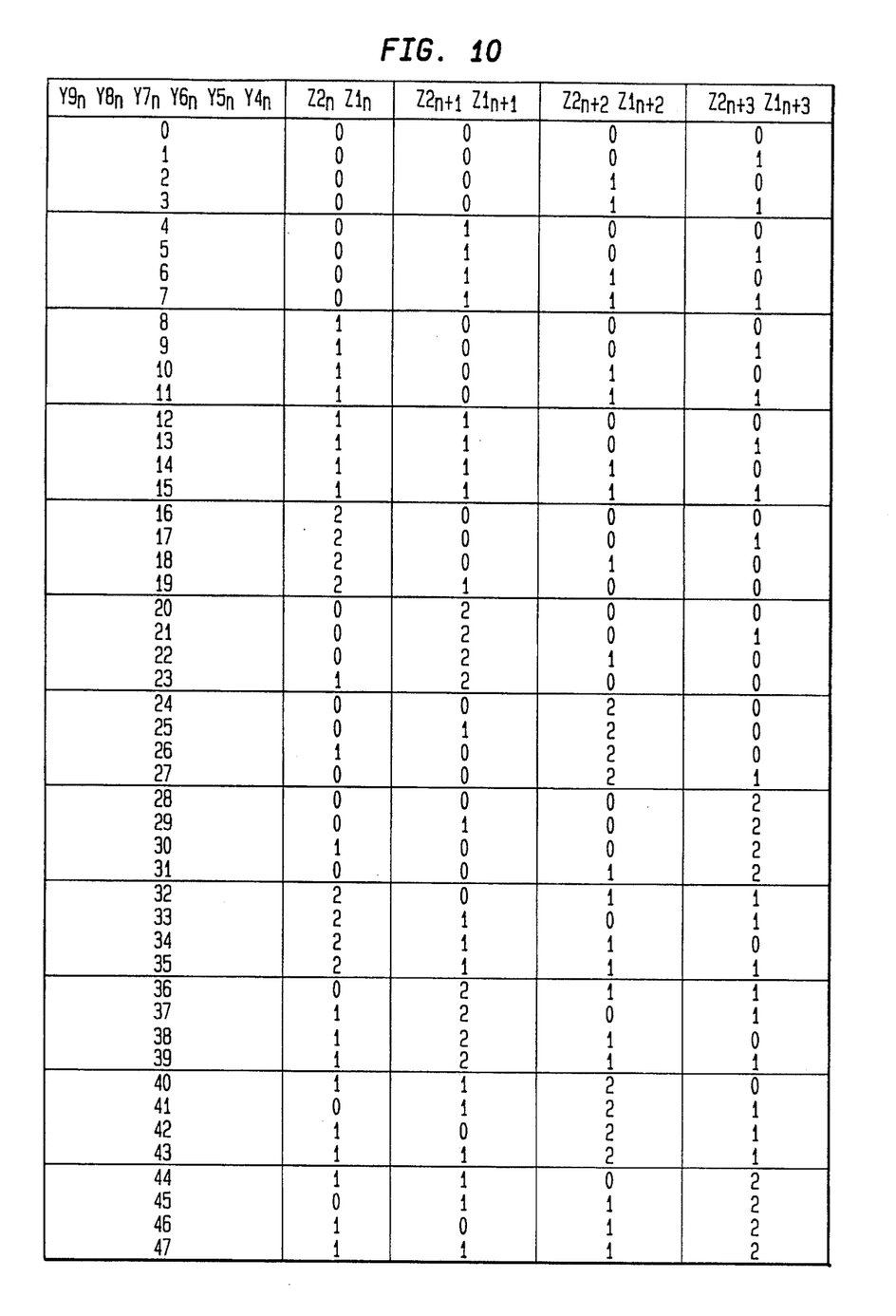

A second coded modulation scheme that can be implemented by the combination of trellis encoder 136 and constellation mapper 139 is shown in FIGS. 8–10. This scheme encodes an average 8.5 bits per four-dimensional symbol.

The modulation scheme of FIGS. 8–10 is built on the same underlying convolutional code as the first coded modulation scheme. As such, encoder 81 and selector 82 shown in FIG. 8 are identical to encoder 41 and selector 42 shown in FIG. 4, so that, again, three input bits are used to identify a sequence of four one-dimensional subsets for each symbol interval. The remaining 5.5 uncoded bits per symbol are used to select a symbol from the identified subset sequence.

Obviously it is not possible to operate on a half-bit. However, this second coded modulation scheme uses the invention set forth in my U.S. Pat. No. 4,941,154 issued Jul. 10, 1990 in order to realize a non-integral, or so-called "fractional" bit rate. In particular, the trellis encoder 136 collects from RS symbol interleaver 134 17 bits over two successive symbol intervals. Two groups of three, i.e., six, of those bits are used to identify the one-dimensional subset sequence for a respective two successive symbol interval. The remaining eleven uncoded bits are used to jointly select a pair of four-dimensional symbols from the two identified one-dimensional subset sequences.

The manner in which this is done is shown in FIG. 8. Of the 11 uncoded bits, three are applied to a fractional bit encoder 83, implemented as the lookup table of FIG. 9. As shown in FIG. 9, the output of encoder 83 is in the form of two pairs of bits, each of which can take on one of three possible bit patterns—00, 01 and 10. For each symbol interval one of the two pairs of encoder 83 output bits—denoted $Y9_n$ and $Y8_n$—is combined with four of the remaining eight uncoded bits to provide a six-bit input to bit converter 85. The latter, similar to the first scheme, is used to select a four-dimensional symbol from the first identified one-dimensional subset sequence, per the lookup table shown in FIG. 10. Thereafter, the second of the two pairs of encoder 83 output bits—which will be bits $Y9_{n+4}$ and $Y8_{n+4}$—will be combined with the four remaining uncoded bits to provide a second six-bit input to bit converter 85, so that a second four-dimensional symbol will be selected from the second identified one-dimensional subset sequence. Note that because bits $Y9_n$ and $Y8_n$ do not take on the value 11, the total number of different bit patterns represented by bits $Y4_n$ through $Y9_n$ is 48. The lookup table of FIG. 10, similar to the lookup table of FIG. 6, maps the 48 input bit patterns into the 48 lowest-energy symbols.

(It may also be observed that because the patterns 00, 01 and 10 of bits $Y9_n$ and $Y8_n$ do not appear with equal probability-as can be verified directly from FIG. 9—the 48 different bit patterns of bits $Y9_n$ through $Y4_n$ also do not appear with equal probability. Thus the table of FIG. 10 is, advantageously, constructed in such a way that the first 32 patterns—each of which occurs with equal probability of 3/128—map to the 32 lowest-energy symbols. The remaining 16 patterns—each of which occurs with equal probability of 2/128—map to the remaining 16 symbols.)

Any number of further coded modulation schemes, based on the same convolutional code and the same 6-signal-point base constellation, can be implemented by, for example, varying the number of bits that are collected per symbol interval and accommodating the varying number of resulting uncoded bits via different mapping strategies following the basic concepts illustrated above. For example, an average bit rate of 8.25 bits per symbol can be accommodated by performing the encoding over four four-dimensional symbol intervals—that is 33 bits per four four-dimensional symbol intervals—by mapping nine of the 21 uncoded bits into four three-bit groups which, for each symbol interval, are combined with three of the remaining twelve uncoded bits to address a bit converter similar to bit converter 85. In such a scheme, there will be a total of 40 different four-dimensional symbols in each one-dimensional subset sequence.

CHARACTERISTICS OF THE CODES

Figure 11:
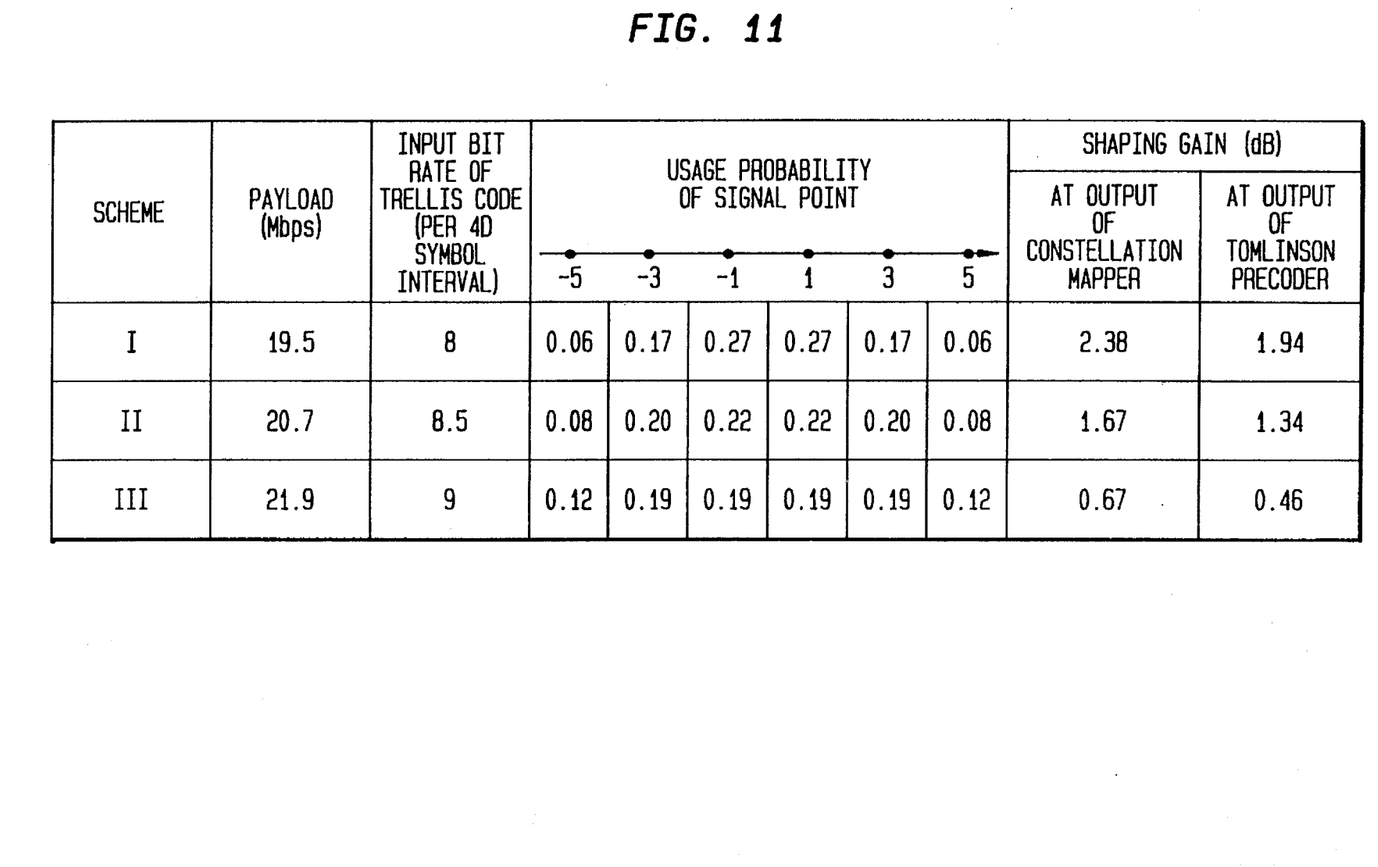
FIG. 11 is a table comparing the characteristics of the aforementioned first and second trellis codes and a third trellis code that can be used by the HDTV system.

FIG. 11 presents various properties and characteristics of the two coded modulation schemes explicitly described above, as well as a third, 9-bits-per-symbol interval scheme based on the same convolutional code and base constellation, that code being described in my co-pending U.S. Patent application, Ser. No. 8/226,606 filed Apr. 12, 1994, hereby incorporated by reference.

For each of the modulation schemes-denoted for convenience as I, II and III—the signaling rate is the same, namely $10.76 \times 10^6$ signal points per second, or 10.76 Mbaud. The trellis code input bit rates of 8, 8.5 and 9 bits per symbol interval correspond to so-called "payloads"—i.e., bit rates at the input to concatenated encoder 13—of 19.5, 20.7 and 21.9 Mbps, given the use of the above-mentioned RS(208, 188) Reed-Solomon code.

It is to be observed that, the signal points of one-dimensional base constellation at the output of constellation mapper 139 do not appear with equal probability. Thus, as shown in FIG. 11 for scheme I, for example, the signal points at coordinates −5, −3, −1, 1, 3 and 5 appear with probabilities 0.06, 0.17, 0.27, 0.27, 0.17 and 0.06, respectively. A similar effect is observed for the other two schemes as well. Note that for each scheme, the probability of use decreases with increasing signal point energy, i.e., squared coordinate value. A consequence of this fact is that, for a given distance between the signal points of the base constellation, the average energy of the selected signal points is less than it would be if they were used with equal probabilities. Equivalently, for a given average energy that is allowed by a particular transmission environment, the distance between the signal points of the base constellation can be increased, thereby providing enhanced noise immunity. (Indeed, conventional circuitry in the VSB modulator automatically adjusts the actual average transmit power to correspond to that which the system is desired to operate at.) Such a coded modulation scheme is said to exhibit "shaping gain," the term "shaping" being used to reflect the fact that the distribution of signal point probabilities is "shaped" rather than being a straight line.

Quantitatively, the shaping gain of a given scheme at the output of constellation mapper 139 is a function of a ratio X/Y—typically expressed in dB—where X is the average signal point energy of the base constellation that would result if the signal points appeared with equal probability, and Y is the average signal point energy at the output of constellation output 139 for the scheme under consideration. Thus, for example, measuring the shaping gain at the output of constellation mapper 139 it will be seen that the value of X for each of the three schemes shown in FIG. 11 is 11.67 $(=[1^2+(-1)^2+3^2+(-3)^2+5^2+(-5)^2]/6)$. The value of Y for, for example, scheme I is 6.75 $(=0.27 \times 1^2+0.27 \times (-1)^2+0.17 \times 3^2+0.17 \times (-5)^2)$. The shaping gain is thus 11.67/6.75=1.73, which is equivalent to 2.38 dB, as noted in FIG. 11. The shaping gains for schemes II and III are 1.67 dB and 0.67 dB, respectively. It is thus seen that one can achieve, via the use of different ones of these coded modulation schemes, increased levels of noise immunity in exchange for a decreased payload. And, advantageously, it will be noted that the varying amounts of shaping gain are all achieved using a particular one, i.e., 6-signal-point, one-dimensional base constellation which is, advantageously, the smallest constellation that can be used for any of the schemes I, II and III to support the input bit rates of the trellis encoder. Moreover, the actual amount of shaping gain achieved by, for example, schemes I and II is really quite significant in terms of real life system performance.

Preservation of Shaping Gain

We refer, first, back to FIG. 1 for a brief description of the (well known) structure of Tomlinson precoder 17. In particular, the Tomlinson precoder input signal is received on lead 151 from signal point interleaver 15. That signal is added by combiner 175 to a feedback signal provided on lead 174. The resulting signal is processed by modulo device 171. The function of modulo device is to ensure that the output of the Tomlinson precoder as a whole on lead 177 is maintained within a predetermined range of values—in this case in the range between −6 and +6. Conceptually it does this, quite simply, by performing the conventional modulo −12 function. That is, it repetitively adds or subtracts the value "12" from the combiner output until the result falls within that range. The aforementioned feedback signal on lead 174 is a function of past Tomlinson precoder outputs on lead 177. It is, more particularly, provided by filter 173, which is illustratively a finite impulse response (FIR) filter, having a Z-transfer function given by $$\sum_{i=1}^{k} h_i Z^{-i},$$

where $Z^{-i}$ denotes a delay element with a delay amount of i signaling intervals. In an illustrative implementation of the Tomlinson precoder, k=36, and $h_i$ and $h_{36}$ through h 36 have values ranging between −0.0865 and 0.0603.

As noted above, Tomlinson precoder 17 is provided in the transmitter of FIG. 1 in order to compensate for the forced intersymbol interference (ISI) that is created by NTSC filter 37 in the receiver. Although the use of a Tomlinson precoder will eliminate the forced ISI, it is commonly held belief that the Tomlinson precoder will remove any "shaping gain" that might be provided by the preceding encoder. This belief is a consequence of the fact that in the prior art's understanding of the Tomlinson precoder operation, it was assumed that each allowed precoder output value will appear with the same probability as any other allowed value. In this example, then, it would generally be believed to be the case that the signal values at the output of Tomlinson precoder 17 on lead 177 would be uniformly distributed across the range −6 to +6. A further consequence of this assumption is that one designing a coded modulation scheme for use in conjunction with a Tomlinson precoder would have as specific design goal the use of each signal point with as little shaping gain as possible (i.e., with signal point probabilities that are as equal as possible) because shaping gain is achieved at the expense of bandwidth efficiency, and there is no point in sacrificing bandwidth efficiency for shaping gain, only to have the shaping gain removed by the Tomlinson precoder.

In accordance with the present invention, I have recognized that the aforementioned common understanding is erroneous. Specifically, I have recognized that if the average energy of the feedback signal on lead 174 is relatively weak compared to the average energy of the Tomlinson precoder input signal on lead 151, such as about 12 dB weaker, a great deal of the shaping gain (if any) provided by the channel code will be preserved in the Tomlinson precoder output. Indeed, the above-noted illustrative values for the coefficients $h_i$ will provide such a relatively weak feedback signal. Thus an overall transmission scheme embodying the principles of the present invention comprises a channel encoder which provides a more-than-minimal amount of shaping gain in conjunction with a Tomlinson precoder.

The shaping gain of a given scheme at the output of Tomlinson precoder 17 is defined similarly to that at the output of constellation mapper 139. It is defined as a ratio X/V, where X is as before, the average signal point energy of the base constellation that: would result if the signal points appeared with equal probability, and V is the average signal point energy at the output of Tomlinson precoder 17 to the scheme under consideration. With this definition, the shaping gains of Schemes I, II, and III at the output of Tomlinson precoder 17 are 1.94, 1.34 and 0.46 dB, respectively, as shown in the last column of FIG. 11.

The invention, more particularly, contemplates the use of a channel code which provides such a high degree of shaping gain of its signal points that the shaping gain of the signal points at the output of the Tomlinson precoder is at least 1.0 dB. A shaping gain of 1.0 dB is significant, and is achieved only via such a large tradeoff in bandwidth efficiency that, absent the teachings of the present invention, the prior art—because of the aforementioned commonly held belief—is not led to use, in a system which includes a Tomlinson precoder, a channel code having such a large amount of shaping gain. (It may be noted that even under the constraint mentioned above vis-a-vis the Tomlinson precoder feedback signal, there will still be a small loss of the shaping gain due to the action of the Tomlinson precoder, so that the shaping gain provided by the channel code itself, i.e., prior to the Tomlinson precoding, will have to be at least a bit greater than 1.0 dB.)

Shaping Gain Diversity

The fact that different payloads are achieved by the above-described coded modulation schemes via the use of coded modulation schemes having different amounts of shaping gain but being within the same family, i.e., using the same base constellation and the same underlying convolutional code, can be advantageously taken advantage of to achieve something that I call "shaping gain diversity." By this I mean the supporting of different payloads by simply switching among different coded modulation schemes within the family, each having a different amount of shaping gain. Such shaping gain diversity can be implemented in, for example, the time domain so that a broadcaster can trade payload for noise immunity in response to a) changing channel conditions (on either a long- or short-term basis) or b) changing service requirements. As an example of the former, the quality of the received signal could be measured at a remote sensing site and fed back via a wired or wireless telemetry channel to the broadcast site. If the quality deteriorates significantly, the transmitter can "fall back" to a lower-bit-rate, more-noise-immune scheme. As an example of the latter, a broadcaster may decide to augment a simple HDTV broadcast service offering to include a relatively-low-bit-rate news or other data (e.g., stock price) service. By changing from one of the coded modulation schemes to another, the additional payload required in order to deliver such an auxiliary service can be accommodated. Indeed, it will be appreciated from a consideration of these two examples that not all transmitters operating in a given geographic area need to be using the same coding scheme at the same time. Different coding schemes can be used simultaneously for different channels.

In FIG. 1, control lead 12 is a lead extending to TV signal source 11 and concatenated encoder 13. There is provided on this lead a control signal specifying the desired payload rate, thereby allowing the signal source and encoder to adapt their operations to the desired rate.

Of course, if the broadcasters are permitted to employ such shaping gain diversity in their service offerings, the HDTV or other receivers need to be able to decode signals transmitted using any of the different coding schemes. Advantageously, when the shaping gain diversity is implemented via coding schemes from the same "family" as defined above, a relatively small amount of additional circuitry is required in order to be able to do that decoding. In particular, by using the same constellation, the same receiver "front end," e.g., demodulator, equalizer, etc. can be used. Moreover, the major portion of the Viterbi decoder—notably the portion which carries out the so-called maximum likelihood computations—will also be the same. The only change is in the circuitry which. converts the recovered sequence of signal points back into bits. This, however, is a simple matter of using receiver lookup tables corresponding to the lookup tables used in the transmitter to implement the bit converters and fractional bit encoders, as described above.

In the receiver, more particularly, an ability to determine which scheme is being used can be achieved in various different ways. One way would be to monitor the distribution of sliced versions of the outputs of equalizer 36 and infer which coding scheme was used by the transmitter based on an a priori knowledge of the signal point distributions of the different coding schemes as shown in FIG. 11. Another way would be for the transmitter to explicitly encode this information into the HDTV signal itself.

The foregoing merely illustrates the principles of the invention. For example, all of the parameter values herein, such as the number of signal points in the base constellation, the number of dimensions of the base constellation, the number of states and the number of dimensions in the trellis codes, the bit rates, the signaling rates etc. are all illustrative. Moreover, although the signals communicated are illustratively television signals, they are, of course, simply streams of bits and, as such, could be derived from any source and could be, for example, derived from text or any other source. Additionally, although the convolutional encoder shown and described herein is a systematic convolutional encoder, it need not be.

Moreover, although the various components of the transmitter and receiver are shown as individual functional blocks, the functions of any one or more of them could be provided by, for example, a single processor operating until software control; by one or more digital signal processing (DSP) chips; or by special—purpose integrated circuitry.

Other implementational variations are possible. For example, trellis encoder 136, constellation mapper 139, and signal point interleaver 15 could be replaced by a bank of trellis encoders and associated constellation mappers and interleavers. Each of the trellis encoders would receive a successive output of the interleaver in a round-robin fashion and each of the interleavers would provide a one-dimensional signal point in a round-robin fashion to Tomlinson precoder 17. The aforementioned bands of trellis encoders and associated constellation mappers need not be physically separate elements. Rather, the effect of such a bank could be achieved by time-sharing a single trellis encoder and constellation mapper in a manner that will be apparent to those skilled in the art.

In the case where an HDTV signal is not subject to co-channel interference from NTSC signals, the Tomlinson precoder will be removed from the HDTV transmitter of FIG. 1, and its associated NTSC rejection filter will be removed from the HDTV receiver of FIG. 3.

It will thus be appreciated that those skilled in the an will be able to devise numerous arrangements which, although not explicitly shown or described herein, embody the principles of the invention and are within its spirit and scope.

What is claimed is:

1. Apparatus comprising
   means for receiving a stream of data,
   encoder means for mapping said data into signal points of a predetermined base constellation with unequal probabilities,
   means for processing the mapped signal points through a Tomlinson precoder, said encoder means and said Tomlinson precoder being such that the signal points provided at the output of said Tomlinson precoder exhibit at least 1.0 dB of shaping gain, and
   means for applying to a transmission channel a modulated signal representing said signal points provided at the output of said Tomlinson precoder.

2. The invention of claim 1 wherein said stream of data represents a television signal.

3. The invention of claim 2 wherein said television signal is an HDTV signal.

4. The invention of claim 1 wherein said encoder means includes a trellis encoder.

5. The invention of claim 1 wherein said encoder means includes a Reed-Solomon encoder concatenated with a trellis encoder.

6. The invention of claim 1 wherein said signal points are one-dimensional signal points of an N-dimensional symbol.

7. The invention of claim 6 wherein said modulated signal is a vestigial sideband signal.

8. The invention of claim 1 wherein said Tomlinson precoder includes a combiner which combines said mapped signal points with a feedback signal which is weak compared to said mapped signal points.

9. The invention of claim 8 wherein said feedback signal is substantially at least 12 db weaker than said mapped signal points.

10. The invention of claim 8 wherein said Tomlinson precoder further includes a finite impulse response filter which generates said feedback signal, said filter having as its input said signal points provided at the output of said Tomlinson precoder.

11. The invention of claim 10 wherein said Tomlinson precoder further includes a modulo device which performs a modulo function on the output of said combiner to generate said signal points provided at the output of said Tomlinson precoder.

12. The invention of claim 8 wherein said feedback signal is substantially at least 12 db weaker than said mapped signal points.

13. Receiver apparatus for use in a system in which a stream of data is received, in which said data is mapped by an encoder into signal points of a predetermined base constellation with unequal probabilities, in which the mapped signal points are processed through a Tomlinson precoder, the encoder and the Tomlinson precoder being such that the signal points provided at the output of the Tomlinson precoder exhibit at least 1.0 db of shaping gain, and in which a modulated signal representing the signal points provided at the output of the Tomlinson precoder are applied to a transmission channel, said receiver apparatus comprising
   means for receiving said modulated signal from said transmission channel, and
   means for recovering said data from the received signal.

14. The invention of claim 13 wherein said means for recovering includes a rejection filter having nulls at a plurality of predefined frequencies.

15. The invention of claim 14 wherein said rejection filter is an NTSC rejection filter.

16. The invention of claim 13 wherein said stream of data represents a television signal and wherein said apparatus further includes television means for displaying the recovered data.

17. The invention of claim 16 wherein said television signal is an HDTV signal.

18. The invention of claim 13 wherein said encoder includes a trellis encoder and wherein said recovering means includes a trellis decoder.

19. The invention of claim 13 wherein said encoder includes a Reed-Solomon encoder concatenated with a trellis encoder and wherein said recovering means includes a Viterbi decoder concatenated with a Reed-Solomon decoder.

20. The invention of claim 13 wherein said signal points are one-dimensional signal points of an N-dimensional symbol.

21. The invention of claim 20 wherein said modulated signal is a vestigial sideband signal.

22. The invention of claim 13 wherein said Tomlinson precoder includes a combiner which combines said mapped signal points with a feedback signal which is weak compared to said mapped signal points.

23. The invention of claim 22 wherein said feedback signal is substantially at least 12 db weaker than said mapped signal points.

24. The invention of claim 22 wherein said Tomlinson precoder further includes a finite impulse response filter which generates said feedback signal, said filter having as its input said signal points provided at the output of said Tomlinson precoder.

25. The invention of claim 24 wherein said Tomlinson precoder further includes a modulo device which performs a modulo function on the output of said combiner to generate said signal points provided at the output of said Tomlinson precoder.

26. The invention of claim 22 wherein said feedback signal is substantially at least 12 db weaker than said mapped signal points.

* * * * *